United States Patent
Neggiani et al.

(10) Patent No.: US 11,512,104 B2
(45) Date of Patent: Nov. 29, 2022

(54) PROCESS FOR THE PREPARATION OF THE POLYMORPH F OF SODIUM NERIDRONATE

(71) Applicant: ABIOGEN PHARMA S.P.A., Pisa (IT)

(72) Inventors: Fabio Neggiani, Pisa (IT); Stefano Luca Giaffreda, Imola (IT); Serena Fabbroni, Medicina (IT); Michel Chiarucci, Castenaso (IT); Barbara Politi, Leghorn (IT)

(73) Assignee: ABIOGEN PHARMA S.P.A., Loc. Ospedaletto (IT)

( * ) Notice: Subject to any disclaimer, the term of this patent is extended or adjusted under 35 U.S.C. 154(b) by 0 days.

(21) Appl. No.: 17/595,992

(22) PCT Filed: Jun. 5, 2020

(86) PCT No.: PCT/IB2020/055304
§ 371 (c)(1),
(2) Date: Dec. 1, 2021

(87) PCT Pub. No.: WO2020/245780
PCT Pub. Date: Dec. 10, 2020

(65) Prior Publication Data
US 2022/0267359 A1    Aug. 25, 2022

(30) Foreign Application Priority Data
Jun. 7, 2019    (IT) .................. 102019000008391

(51) Int. Cl.
*C07F 9/38*    (2006.01)
(52) U.S. Cl.
CPC ........ *C07F 9/3873* (2013.01); *C07B 2200/13* (2013.01)
(58) Field of Classification Search
CPC ........................... C07F 9/3873; C07B 2200/13
USPC ........................................................ 562/13
See application file for complete search history.

(56) References Cited

FOREIGN PATENT DOCUMENTS

| EP | 3553067 A1 | 10/2019 |
|---|---|---|
| WO | 2008004000 A1 | 1/2008 |

OTHER PUBLICATIONS

Keiczykowski G R "Preparation of (4-amino-1-hydroxybutylidene)bisphosphonic acid sodium salt, MK2117 (Alendronate Sodium). An improved procedure for the preparation of 1-hydroxy-1,1,-bisphosphonic acids", Journal of Organic Chemistry, American Chemical Society, US, vol. 60, No. 25, Jan. 1, 1995, pp. 8310-8312.
Search Report and Written Opinion of PCT/IB2020/055304 dated Sep. 4, 2020.

*Primary Examiner* — Ana Z Muresan
(74) *Attorney, Agent, or Firm* — Silvia Salvadori, P.C.; Silvia Salvadori

(57) ABSTRACT

The present invention relates to a new process for the preparation of the crystalline polymorph of sodium neridronate in form hemihydrate F, comprising the following steps: a) reacting the 6-aminohexanoic acid with a mixture of phosphorous acid and methanesulfonic acid at a temperature in the range from 60 to 80° C., under stirring, until a clear solution is obtained; b) adding phosphorus trichloride to said solution of step (a) under stirring at a temperature in the range of 60 to 80° C.; c) diluting with water the reaction mixture obtained from the previous step (b) and heating said water diluted mixture at a temperature in the range from 80 to 120° C.; d) cooling the heated mixture obtained in step (c) up to room temperature, diluting it with water, then slowly adding an aqueous sodium hydroxide solution up to a pH in the range from 4.2 to 4.6, to obtain a neutralized solution; e) bringing the neutralized solution of step (d) up to a temperature of about 70° C., then subjecting it to a temperature increase in the range from 70 to 140° C., until evaporation of at least 70% of the initial volume of the neutralized solution of step (d), thus obtaining a suspension to be kept under stirring for at least 1 hour; f) cooling the suspension of step (e) up to a temperature in the range from around 5 to 25° C.; and g) recovering the crystalline sodium neridronate in hemihydrate form F by filtering the suspension of the previous step (f). The process is particularly simple, scalable and environmentally sustainable.

16 Claims, 2 Drawing Sheets

PROCESS FOR THE PREPARATION OF THE POLYMORPH F OF SODIUM NERIDRONATE

This application is a U.S. national stage of PCT/IB2020/055304 filed on 5 Jun. 2020, which claims priority to and the benefit of Italian Patent Application No. 102019000008391 filed on 7 Jun. 2019, the contents of which are incorporated herein by reference in their entireties.

FIELD OF THE INVENTION

The present invention relates to a process for the preparation of a crystalline polymorph of sodium neridronate.

BACKGROUND

Sodium Neridronate is the sodium salt of neridronic acid, whose IUPAC name is 6-amino-1-hydroxy-1,1-hexan diphosphonic acid.

Sodium neridronate is represented by the following structural formula:

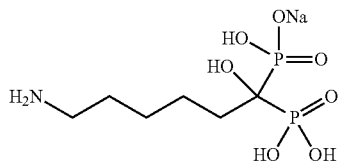

Neridronic acid belongs to the bisphosphonate group, in particular the amino bisphosphonates.

Bisphosphonic acids, in particular amino bisphosphonic acids, and the pharmaceutically acceptable salts thereof, are an important class of drugs useful for the treatment of various pathologies of the musculoskeletal system and calcium metabolism.

The therapeutic properties of bisphosphonates depend in particular on their high affinity for the hydroxyapatite crystals, the main constituents of the bones, to which said molecules bind preventing their resorption.

Bisphosphonates are therefore widely used in clinical practice to treat diseases such as osteoporosis, hyperparathyroidism, hypercalcaemia due to malignant tumors, osteolytic bone metastases, progressive ossifying myositis, universal calcinosis, arthritis, neuritis, bursitis, tendinitis, Paget's disease, osteogenesis imperfecta, Complex Regional Pain Syndrome (CRPS) or algodystrophy and other inflammatory diseases.

Sodium neridronate, specifically in injectable form for intramuscular or intravenous administration, has been successfully used for several years in the treatment of osteogenesis imperfecta, Paget's disease of bone and algodystrophy.

In order to improve the compliance of said drugs, and therefore facilitate their intake by patients, it would be desirable to have solid forms to be administered orally.

The possibility of producing solid pharmaceutical forms for oral administration is in general terms linked to the availability of active pharmaceutical ingredients with adequate characteristics of stability in the solid state.

For this reason, the possibility of producing pharmaceutical preparations based on sodium neridronate in solid form to be administered orally is closely related to the availability of the active ingredient sodium neridronate in the solid form stable over time.

European patent application EP18166508.4, still secret to date, filed by the same applicant, describes for the first time a synthesis and purification process that leads to the obtainment of a polymorphic stable form of sodium neridronate, called form F, which can be used for the preparation of oral solid forms.

Said polymorphic form F of the active principle sodium neridronate is a hemihydrate crystalline form that has proven to be surprisingly stable over time with respect to any other polymorphic form previously available, thus allowing the preparation of new oral solid forms of the active principle, which can be used as an alternative to traditional forms of intramuscular or intravenous injections, much less appreciated by patients in terms of compliance.

The process described in EP18166508.4 has therefore made the incredible contribution on the availability of an industrial method for the preparation of the polymorphic hemihydrate form F of sodium neridronate of great clinical relevance.

According to what is reported in EP18166508.4, said process, when carried out starting from the synthesis step of sodium neridronate involves the following steps:

a) reacting 6-aminohexanoic acid with a mixture of phosphorous acid and methanesulfonic acid and obtaining a mixture;

b) adding phosphorus trichloride to said mixture according to step (a) under stirring at a temperature in the range from 60 to 80° C., keeping the mixture obtained under stirring at a temperature in the range from 60 to 70° C. for at least 15 hours;

c) diluting with water the reaction mixture obtained from the previous step (b) and heating said water diluted mixture at a temperature in the range from 90 to 120° C. for at least 13 hours, obtaining a heated mixture;

d) cooling the heated mixture obtained in step (c) to a temperature below 75° C. and slowly adding sodium hydroxide up to a pH in the range from 3 to 5, thus obtaining a suspension;

e) cooling the suspension obtained in step (d) to a temperature in the range of 10 to 30° C., then slowly adding ethanol to obtain the precipitation of the sodium salt of neridronate sodium in any crystalline form;

f) recovering the sodium neridronate in any crystalline form formed in the previous step (e);

g) dissolving the solid sodium neridronate in any crystalline form of the previous step (f) in water at a temperature in the range from 70 to 90° C. to obtain an aqueous solution of sodium neridronate;

h) adding to the aqueous solution obtained in step (g) a solvent selected from the group consisting of ethanol, 1-propanol and 2-propanol, so that the final volumetric ratio of water:solvent is in the range from 1:0.5 to 1:1, thus obtaining a suspension;

i) mechanically stirring the suspension obtained in step (h) at a temperature in the range from 60 to 95° C.;

l) recovering the crystalline sodium neridronate in the hemihydrate form F formed in the previous step (i).

Said industrial process, as evident, comprises numerous synthesis and purification steps, which require large quantities of solvents.

Therefore, it remains desirable to define an industrially optimized process that allows to reduce the number of steps, reducing both the industrial production costs of the active ingredient and the environmental costs, in terms of both energy and chemical consumption.

The object of the present invention is therefore to provide a new industrially scalable and reproducible process which allows to obtain the sodium neridronate in polymorphic hemihydrate form F with a reduced number of steps and a low environmental impact.

SUMMARY OF THE INVENTION

The inventors of the present patent application have surprisingly identified an optimized process for the preparation of the crystalline polymorph in the hemihydrate form F of sodium neridronate, comprising the following steps:
a) reacting 6-aminohexanoic acid with a mixture of phosphorous acid and methanesulfonic acid at a temperature in the range from 60 to 80° C., under stirring, until a clear solution is obtained;
b) adding phosphorus trichloride to said solution of step (a), under stirring, at a temperature in the range from 60 to 80° C.;
c) diluting with water the reaction mixture obtained from the previous step (b) and heating said water diluted mixture at a temperature in the range from 80 to 120° C.;
d) cooling the heated mixture obtained in step (c) up to room temperature, diluting it with water, then slowly adding an aqueous sodium hydroxide solution up to a pH in the range from 4.2 to 4.6, to obtain a neutralized solution;
e) bringing the neutralized solution of step (d) up to a temperature of about 70° C., then subjecting it to a temperature increase in the range from 70 to 140° C., until evaporation of at least 70% of the initial volume of the neutralized solution of step (d), thus obtaining a suspension to be kept under stirring for at least 1 hour;
f) cooling the suspension of step (e) up to a temperature in the range from around 5 to 25° C.; and
g) recovering the crystalline sodium neridronate in hemihydrate form F by filtering the suspension of the previous step (f).

DETAILED DESCRIPTION OF THE INVENTION

The inventors of the present patent application have identified a new process for the preparation of the crystalline hemihydrate form of sodium neridronate, called Form F, with which it is possible to prepare pharmaceutical compositions in solid oral form, with high compliance for patients.

Figure 1:
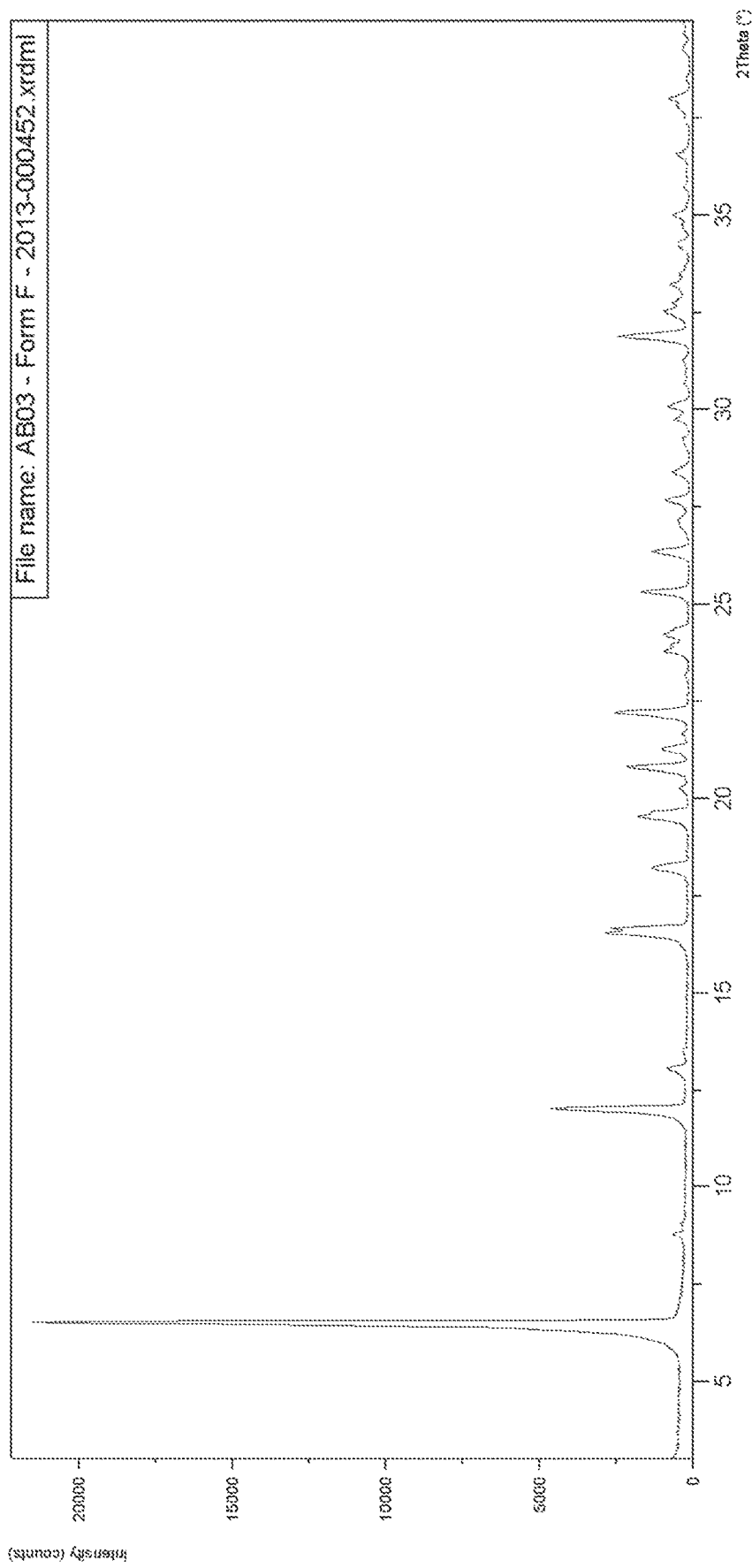
FIG. 1: XRPD of sodium neridronate in crystalline polymorphic hemihydrate form F.
Figure 2:
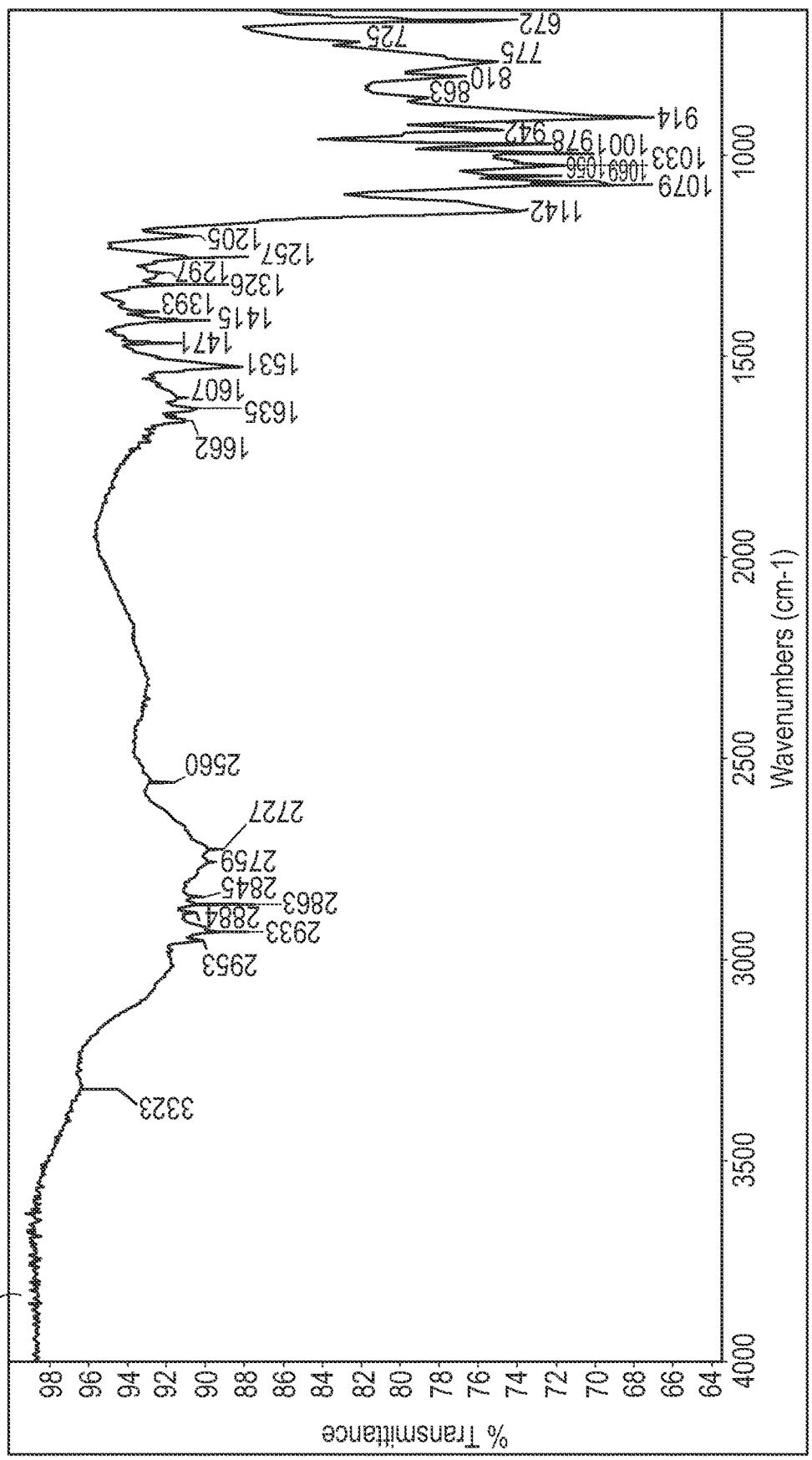
FIG. 2: infrared spectrum of sodium neridronate in crystalline polymorphic hemihydrate form F.

Said hemihydrate crystalline form F of sodium neridronate is in particular the polymorphic form of sodium neridronate whose powder X-ray diffraction spectrum (XRPD), shows peaks at the characteristic values of angle 2θ of 6.51°, 12.02°, 16.51°, 16.66°, 20.80°, 22.21°, 25.30°, 27.65°, 30.05°, 31.87° as evident in FIG. 1. The crystal of said sodium neridronate in polymorphic hemihydrate crystalline form F crystallizes in a monoclinic system with the following cell parameters: a=14.3749 (3) Å, b=8.76600 (10) Å, c=21.2927 (4) Å, α=90°, β=109.339 (2°), γ=90°, V=2531.71 (8) Å3, with space group P21/c. The sodium neridronate in polymorphic hemihydrate crystalline form F is also characterized by a typical infrared spectrum, acquired with an infrared spectrometer based on the Fourier transform (FT-IR), as shown in FIG. 2.

The polymorphic hemihydrate crystalline form F of sodium neridronate, as described in EP18166508.4, is the only polymorphic form known to date that has proven to be sufficiently stable to be used in the preparation of oral solid pharmaceutical forms of sodium neridronate.

It is therefore particularly important to develop an industrially simple, effective and reproducible process for its preparation.

The inventors of the present invention have surprisingly developed a new method, which overcomes the disadvantages of the method described in EP18166508.4, in particular allowing a drastic reduction in the number of steps necessary to obtain the sodium neridronate in the hemihydrate form F, with an important reduction of time, energy and chemical products to be used for its preparation.

Said process comprises the following steps:
a) reacting 6-aminohexanoic acid with a mixture of phosphorous acid and methanesulfonic acid at a temperature in the range from 60 to 80° C., under stirring, until a clear solution is obtained;
b) adding phosphorus trichloride to said solution of step (a), under stirring, at a temperature in the range from 60 to 80° C.;
c) diluting with water the reaction mixture obtained from the previous step (b) and heating said water diluted mixture at a temperature in the range from 80 to 120° C.;
d) cooling the heated mixture obtained in step (c) up to room temperature, diluting it with water, then slowly adding an aqueous sodium hydroxide solution up to a pH in the range from 4.2 to 4.6, to obtain a neutralized solution;
e) bringing the neutralized solution of step (d) up to a temperature of about 70° C., then subjecting it to a temperature increase in the range from 70 to 140° C., until evaporation of at least 70% of the initial volume of the neutralized solution of step (d), thus obtaining a suspension to be kept under stirring for at least 1 hour;
f) cooling the suspension of step (e) up to a temperature in the range from around 5 to 25° C.; and
g) recovering the crystalline sodium neridronate in hemihydrate form F by filtering the suspension of the previous step (f).

Optionally, after filtering the suspension of step (g) the solid can be washed with water/ethanol mixtures or pure ethanol, followed by drying, for example under a nitrogen stream and then under vacuum, or with other methods of the state of the art.

For the purposes of the present invention, room temperature means a temperature in the range from 15 to 25° C.

Preferably, step (a), in which the 6-aminohexanoic acid reacts with a mixture of phosphorous acid and methanesulfonic acid, is carried out using a volume of methanesulfonic acid in the range from 2 to 4 mL per gram of 6-aminohexanoic acid, preferably 4 mL per gram of 6-aminohexanoic acid.

Preferably step (b) of adding phosphorus trichloride is carried out using a stoichiometric excess of phosphorus trichloride, preferably equal to or higher than 2 equivalents with respect to 6-aminohexanoic acid.

Preferably, the step (c) of diluting is carried out by adding volumes of water at least 5 to 10 times higher than the volume of methanesulfonic acid used in step (a), preferably 10 to 20 times higher than said volume.

Preferably in step (d), after the heated mixture obtained in step (c) has been cooled down up to room temperature, the mixture is diluted by adding a volume of water such that the final volume of the mixture before of the neutralization with the sodium hydroxide solution, is in the range from 10 to 70 ml per gram of 6-aminohexanoic acid reacted in step (a), preferably from 30 to 60 ml per gram of 6-aminohexanoic acid. Preferably said dilution water consists of at least 10% of the reactor washing water.

Preferably in step (e) the operation of increasing the temperature in the range from 70 to 140° C., until evaporation of at least 70% of the initial volume of the solution (d), is carried out with a low speed, preferably lower than 4° C./h, even more preferably below 2° C./h.

Preferably the evaporation step (e) is carried out at reduced pressure, with pressure values not lower than about 600 mmHg.

In a preferred embodiment of the invention, the process comprises a further step of adding water at the end of step (d) and before step (e), i.e. the neutralized solution of step (d) is subjected to a dilution step before being subjected to the heating step provided for in step (e). Even more preferably in said dilution step the volume of water added is such that, after said addition, the final volume of the solution is in the range from 30 to 70 ml per gram of 6-aminohexanoic acid reacted in step (a), preferably from 40 to 60 ml per gram of 6-aminohexanoic acid.

As is evident, said new process has as main advantages, compared for example to the process described in EP18166508.4, firstly the total elimination of the steps which involve the separation and isolation of an intermediate solid sodium neridronate, in any polymorphic form, to be converted into sodium neridronate in F form, and secondly, the total elimination of the use of large quantities of anti-solvent to obtain the precipitation of sodium neridronate in form F.

With the sequence of steps developed by the inventors of the present invention it is in fact possible to achieve, by adequately controlling the intermediate evaporation step (e) as specified above, and directly obtain the sodium neridronate in the form F.

Said sodium neridronate in crystalline form F is obtained in excellent yields and purity, with yields often higher than 90%, therefore by means of a very simple process, with reduced environmental impact and easily scalable industrially.

The present invention will now be described with reference to the following examples which are provided for mere illustrative purposes and are not to be understood as limiting the present invention.

Example 1. Preparation of Sodium Neridronate in Hemihydrate Crystalline Form F 20 ml of methanesulfonic acid, 1 eq. of phosphorous acid and 1 eq. of 6-aminohexanoic acid (10 g) were loaded in a jacketed 300 mL reactor, equipped with a stirring shaft with an anchor, a steam condenser connected to a NaOH blast chiller and a drip funnel. The mixture was heated to 65° C. (Tjacket=70° C.) and stirred (75-85 rpm) until completely dissolved. 2 eq. of phosphorus trichloride were then slowly added and under stirring from the drip funnel and the reaction mixture was heated to 65° C. (Tjacket=70° C.) for 18-24 hours. 50 ml of water were then slowly added to the reaction mixture, after which the resulting solution was heated to 85-90° C. (Tjacket=95° C.) for 18-24 hours and finally cooled down up to 25° C. The reaction mixture was then brought to room temperature discharged from the reactor, further diluted with 300 mL of water and a 10% aqueous solution of NaOH was added under stirring, until a pH value of 4.4 was obtained. The neutralized solution was then transferred to a jacketed reactor heated to 70° C. and equipped with a distillation apparatus. The temperature was raised to Tjacket=130° C. by distilling off about 75% of the volume of water under reduced pressure (600 mbar). During the distillation a suspension was formed which was stirred for a few seconds at high speed to remove scale and then at the speed of 75-85 rpm for about 1 hour at Tjacket=125° C. (Tinternal=105-110° C.) at atmospheric pressure. The suspension was finally cooled to a temperature of about 15° C. and then filtered under vacuum through a paper filter. The solid left on the filter was washed with a 1/1 mixture of water/ethanol (8 vol.) and then with pure ethanol (3 vol.) and finally taken under vacuum for 10-15 minutes. A small portion of the still humid product was gently ground and analysed via XRPD to check the shape of the crystals. The wet solid was then dried at 40° C. and 30 mbar for at least 18 hours to determine the yield of the process and the crystalline form of the collected product.

A yield of about 82% was obtained.

The XRPD analyses were performed with an X'pert PRO PANalytical instrument, equipped with an X-ray tube with line focus (voltage and amperage of the tube set at 40 kV and 40 mA respectively) and with a ½° anti-scatter slit, a ½° divergence slit, a 5.00 mm receiving slit, a 0.04 rad soller slit. and an X'Celerator RTMS detector, using Cu-Kalfa1 radiation. The scan was carried out between 3-40° with a step size of 0.0167°. The alignment of the instrument was checked periodically by means of a silicon standard and the sample was prepared by top-loading the powder on glass sample holders.

The diffractogram of the solid obtained, shown in FIG. 1, showed the characteristic peaks 2θ at 6.51°, 12.02°, 16.51°, 16.66°, 20.80°, 22.21°, 25.30°, 27.65°, 30.05° and 31.87° confirming that the process of the invention allowed to obtain sodium neridronate in crystalline hemihydrate form F.

Said evidence was further confirmed by the acquisition of its infrared spectrum, shown in FIG. 2, obtained using a Fourier transform infrared spectrometer (FT-IR), of the type Nicolet FT-IR 6700 Thermo Fisher.

Example 2. Preparation of Sodium Neridronate in Hemihydrate Crystalline Form F 40 ml of methanesulfonic acid, 1 eq. of phosphorous acid and 1 eq. of 6-aminohexanoic acid (10 g) were loaded in a jacketed 300 mL reactor, equipped with a stirring shaft with an anchor, a steam condenser connected to a NaOH blast chiller and a drip funnel. The mixture was heated to 65° C. (Tjacket=70° C.) and stirred (75-85 rpm) until completely dissolved. 2 eq. of phosphorus trichloride were then slowly added and under stirring from the drip funnel and the reaction mixture was heated to 65° C. (Tjacket=70° C.) for 18-24 hours. About 100 ml of water was then slowly added to the reaction mixture, after which the resulting solution was heated to 85-90° C. (Tjacket=95° C.) for 18-24 hours and finally cooled to 25° C. The reaction mixture was then discharged from the reactor, brought to room temperature, diluted with about 100 ml of water coming from the washing of the reactor and an aqueous solution of 30% NaOH was added under stirring, until a value of pH in the range from 4.2 to 4.6 was reached. The neutralized solution was diluted with water up to the volume of 600 mL and then transferred to a jacketed reactor heated to 70° C. and equipped with a distillation apparatus. The temperature was increased to Tjacket=130° C. by distilling off about 75% of the volume of water. During distillation, a suspension was formed which was stirred for a few seconds at high speed to remove scale and then at the rate of 75-85 rpm for about 1 hour at Tjacket=125° C. (Tinternal=105-110° C.). The suspension was finally cooled to a temperature of about 25° C. and then filtered under vacuum through a paper filter. The solid left on the filter was washed with a 1/1 mixture of water/ethanol (8 vol.) and then with pure ethanol (3 vol.) and finally taken under vacuum for 10-15 minutes. A small portion of the still humid product was gently ground and analysed via XRPD to check the shape of the crystals. The wet solid was then dried at 40° C. and 30 mbar for at least 18 hours to determine the yield of the process and the crystalline form of the collected product. A yield of about 96% was obtained.

Also in this case the acquisitions of the XRPD and the infrared spectrum of the obtained crystalline solid confirmed that said solid consisted exclusively of sodium neridronate in hemihydrate crystalline form F.

Example 3. Preparation of Sodium Neridronate in Hemihydrate Crystalline Form F 40 ml of methanesulfonic acid, 1 eq. of phosphorous acid and 1 eq. of 6-aminohexanoic acid (10 g) were loaded in a jacketed 300 mL reactor, equipped with a stirring shaft with an anchor, a steam condenser connected to a NaOH blast chiller and a drip funnel. The mixture was heated to 65° C. (Tjacket=70° C.) and stirred (75-85 rpm) until completely dissolved. 4 eq. of phosphorus trichloride were then slowly added and under stirring from the drip funnel and the reaction mixture was heated to 65° C. (Tjacket=70° C.) for 18-24 hours. About 100 ml of water was then slowly added to the reaction mixture, after which the resulting solution was heated to 85-90° C. (Tjacket=95° C.) for 18-24 hours and finally cooled to 25° C. The reaction mixture was then discharged from the reactor, brought to room temperature, diluted with about 100 ml of water coming from the washing of the reactor and an aqueous solution of 30% NaOH was added under stirring, until a value of pH in the range from 4.2 to 4.6 was reached. The neutralized solution was then diluted with water to a volume of 400 mL, transferred to a jacketed reactor heated to 70° C. and equipped with a distillation apparatus. The temperature was increased to Tjacket=130° C. by distilling off about 75% of the volume of water. During distillation, a suspension was formed which was stirred for a few seconds at high speed to remove scale and then at the rate of 75-85 rpm for about 1 hour at Tjacket=125° C. (Tinternal=105-110° C.). The suspension was finally cooled to a temperature of about 25° C. and then filtered under vacuum through a paper filter. The solid left on the filter was washed with a 1/1 mixture of water/ethanol (8 vol.) and then with pure ethanol (3 vol.) and finally taken under vacuum for 10-15 minutes. A small portion of the still humid product was gently ground and analysed via XRPD to check the shape of the crystals. The wet solid was then dried at 40° C. and 30 mbar for at least 18 hours to determine the yield of the process and the crystalline form of the collected product.

A yield of about 92% was obtained.

Also in this case the acquisitions of the XRPD and the infrared spectrum of the obtained crystalline solid confirmed that said solid consisted exclusively of sodium neridronate in hemihydrate crystalline form F.

As evident therefore also from the outcome of the experimental tests carried out, the process object of the invention is a simple, scalable process, which allows obtaining with excellent yields the sodium neridronate in hemihydrate polymorphic form F, therefore suitable for being used industrially for the production of said active ingredient.

The invention claimed is:

1. A process for the preparation of sodium neridronate in crystalline form hemihydrate F, comprising the following steps:
   a) reacting 6-aminohexanoic acid with a mixture of phosphorous acid and methanesulfonic acid at a temperature in the range from 60 to 80° C., under stirring, until a clear solution is obtained;
   b) adding phosphorus trichloride to said solution of step (a), under stirring, at a temperature in the range from 60 to 80° C.;
   c) diluting with water the reaction mixture obtained from the previous step (b) and heating said water diluted mixture at a temperature in the range from 80 to 120° C.;
   d) cooling the heated mixture obtained in step (c) up to room temperature, diluting it with water, then slowly adding an aqueous sodium hydroxide solution up to a pH in the range from 4.2 to 4.6, to obtain a neutralized solution;
   e) bringing the neutralized solution of step (d) up to a temperature of about 70° C., then subjecting it to a temperature increase in the range from 70 to 140° C., until evaporation of at least 70% of the initial volume of the neutralized solution of step (d), thus obtaining a suspension to be kept under stirring for at least 1 hour;
   f) cooling the suspension of step (e) up to a temperature in the range from around 5 to 25° C.; and
   g) recovering the crystalline sodium neridronate in hemihydrate form F by filtering the suspension of the previous step (f).

2. The process according to claim 1, wherein in step (a) 6-aminohexanoic acid is reacted with a mixture of phosphorous acid and methanesulfonic acid using a volume of methanesulfonic acid in the range from 2 to 4 mL per gram of 6-aminohexanoic acid.

3. The process according to claim 1, wherein in step (b) of adding phosphorus trichloride, a stoichiometric excess of phosphorus trichloride is used.

4. The process according to claim 1, wherein the step (c) of diluting is carried out by adding volumes of water at least 5 to 10 times higher than the volume of methanesulfonic acid used in step (a).

5. The process according to claim 1, wherein during step (d), the mixture cooled down up to room temperature is diluted by adding a volume of water such that the final volume of the mixture is in the range from 10 to 70 ml per gram of 6-aminohexanoic acid of step (a).

6. The process according to claim 5, wherein said volume of dilution water consists of at least 10% of a reactor washing water.

7. The process according to claim 1, wherein in step (e) the operation of increasing the temperature in the range from 70 to 140° C., until evaporation of at least 70% of the initial volume of the neutralized solution of step (d), is carried out with a speed lower than 4° C./h.

8. The process according to claim 1, wherein the evaporation of step (e) is carried out at a pressure not lower than about 600 mmHg.

9. The process according to claim 1, wherein at the end of step (d) and before step (e), the neutralized solution of step (d) is subjected to a dilution step before being subjected to the heating step provided in step (e).

10. The process according to claim 9, wherein in the dilution step the volume of water added is such that, after said addition, the final volume of the solution is in the range from 30 to 70 ml per gram of 6-aminohexanoic acid reacted in step (a).

11. The process according to claim 2, wherein in step (a) 6-aminohexanoic acid is reacted with a mixture of phosphorous acid and methanesulfonic acid using a volume of methanesulfonic acid of 4 mL per gram of 6-aminohexanoic acid.

12. The process according to claim 3, wherein in step (b) of adding phosphorus trichloride, a stoichiometric excess of phosphorus trichloride equal to or higher than 2 equivalents with respect to 6-aminohexanoic acid is used.

13. The process according to claim 4, wherein the step (c) of diluting is carried out by adding volumes of water from 10 to 20 times higher than the volume of methanesulfonic acid used in step (a).

14. The process according to claim 5, wherein during step (d), the mixture cooled down up to room temperature is diluted by adding a volume of water such that the final volume of the mixture is in the range from 30 to 60 ml per gram of 6-aminohexanoic acid of step (a).

15. The process according to claim 7, wherein in step (e) the operation of increasing the temperature in the range from 70 to 140° C., until evaporation of at least 70% of the initial volume of the neutralized solution of step (d), is carried out with a speed lower than 2° C./h.

16. The process according to claim 10, wherein in the dilution step the volume of water added is such that, after said addition, the final volume of the solution is in the range from 40 to 60 ml per gram of 6-aminohexanoic acid reacted in step (a).

\* \* \* \* \*